(12) United States Patent
Dostal et al.

(10) Patent No.: US 9,596,863 B2
(45) Date of Patent: Mar. 21, 2017

(54) AUTOMATIC LEG SKINNER

(71) Applicant: Marel Meat Processing Inc., Des Moines, IA (US)

(72) Inventors: Darin F. Dostal, Altoona, IA (US); Colin Ray Hart, Ankeny, IA (US); Gregory Anderson, West Des Moines, IA (US); Stephen H. Cate, Johnston, IA (US)

(73) Assignee: Marel Meat Processing Inc., Des Moines, IA (US)

( * ) Notice: Subject to any disclaimer, the term of this patent is extended or adjusted under 35 U.S.C. 154(b) by 0 days.

(21) Appl. No.: 14/808,558

(22) Filed: Jul. 24, 2015

(65) Prior Publication Data

US 2017/0020144 A1    Jan. 26, 2017

(51) Int. Cl.
*A22B 5/16* (2006.01)
*A22B 7/00* (2006.01)

(52) U.S. Cl.
CPC ............... *A22B 5/16* (2013.01); *A22B 7/001* (2013.01)

(58) Field of Classification Search
CPC .......... A22C 17/12; A22C 25/06; A22B 5/161
USPC .......... 452/125, 128–130, 132, 133
See application file for complete search history.

(56) References Cited

U.S. PATENT DOCUMENTS

| | | | | |
|---|---|---|---|---|
| 4,608,732 A | * | 9/1986 | Hill ................... | A22C 21/0092 452/111 |
| 4,610,051 A | * | 9/1986 | Martin ............... | A22C 21/0092 452/130 |
| 5,637,038 A | * | 6/1997 | Davis ................. | A22C 21/0092 452/111 |
| 6,986,707 B2 | * | 1/2006 | Van Den Nieuwelaar ......... | A22C 1/0023 452/187 |
| 7,059,954 B2 | * | 6/2006 | Annema ............ | A22C 21/0092 452/135 |
| 7,232,365 B2 | * | 6/2007 | Annema ............ | A22C 21/0084 452/167 |
| 7,244,174 B2 | * | 7/2007 | Schill ................. | A22C 25/17 452/130 |
| 7,942,730 B2 | * | 5/2011 | Hagendoorn ...... | A22C 21/0092 452/125 |
| 7,967,668 B2 | * | 6/2011 | Janssen ............. | A22C 21/0023 452/125 |
| 8,192,258 B2 | * | 6/2012 | Janssen ............. | A22C 21/0023 452/136 |
| 8,585,473 B2 | * | 11/2013 | Van Den Nieuwelaar ......... | A22C 21/0092 452/127 |
| 8,808,068 B2 | * | 8/2014 | Stooker ............. | A22C 21/0076 452/125 |

* cited by examiner

*Primary Examiner* — Richard Price, Jr.
(74) *Attorney, Agent, or Firm* — Zarley Law Firm, P.L.C.

(57) ABSTRACT

An automatic skinning assembly having a loading station, a first device, and a conveyor assembly extending between the first skinning device and the second skinning device.

20 Claims, 3 Drawing Sheets

AUTOMATIC LEG SKINNER

BACKGROUND OF THE INVENTION

This invention is directed toward an automatic skinning device and more particularly a skinning device that removes skin from the inside, front, outside and back side of a food product automatically.

In the meat processing industry it is desirable to remove the skin from meat parts like pork legs. Today this is done using a knife or a semi-automatic open top skinning machine. Not only does this method require substantial labor, but it also presents the possibility for lacerations and repetitive motion injuries. Furthermore, the present method results in yield loss due to the removal of lean in the process of removing the skin. Also, it is desirable to provide skins of varying thicknesses and sizes for further processing of the removed skin material. It is also the nature of open top skinning machines to leave skin patches needing to be removed later with a knife and further reducing yields. In addition, it is necessary on pork legs to provide as large a sheet of useable skin as possible.

Automated systems have been tried in the past to remove the skin automatically from pork legs and other meat legs. They have not been successful because they have approached the problem by attempting to remove all of the skin in one pass. Not only is this undesirable, but it also results in excessive skin patches. Another disadvantage of these machines is due to their inability to easily adjust the skin thickness to meet changing processor specifications. In addition, animal legs are round in nature which makes automatically removing the skin from them more difficult.

Therefore, a primary objective of this invention is to provide a method and apparatus to remove the skin from animal legs that improves yields and reduces labor.

Another objective is to provide a method and apparatus to remove the skin automatically in two steps.

A further objective is to have a method and apparatus to remove the skin automatically for both left and right hand legs using one machine.

Also, an objective is to have a method and apparatus to adjust the skin thickness easily.

These and other objectives will be apparent to those skilled in the art based on the following disclosure.

SUMMARY OF THE INVENTION

An automatic skinning assembly has a loading station that includes a platform, window with a light curtain, a first tray and a second tray that rotates a food product to a first skinning device. Adjacent the first skinning device is a shank hold down device that engages the shank of the food product during the first skinning pass. Additionally, above and parallel the skinning mechanism a rotation device is positioned to assist rotation of the leg to insure complete skinning during the first step.

A conveyor assembly transports the food product from the first skinning device to a second skinning device. The conveyor assembly includes a transport convey, a turning plate that rotates the food product horizontally on the transport conveyor, positioning conveyors or rails that partially lifts the food product off the transport conveyor to a generally vertical position, and a v-conveyor for positioning and presenting the food product to the second skinning device.

DETAILED DESCRIPTION OF THE PREFERRED EMBODIMENT

Figure 1:
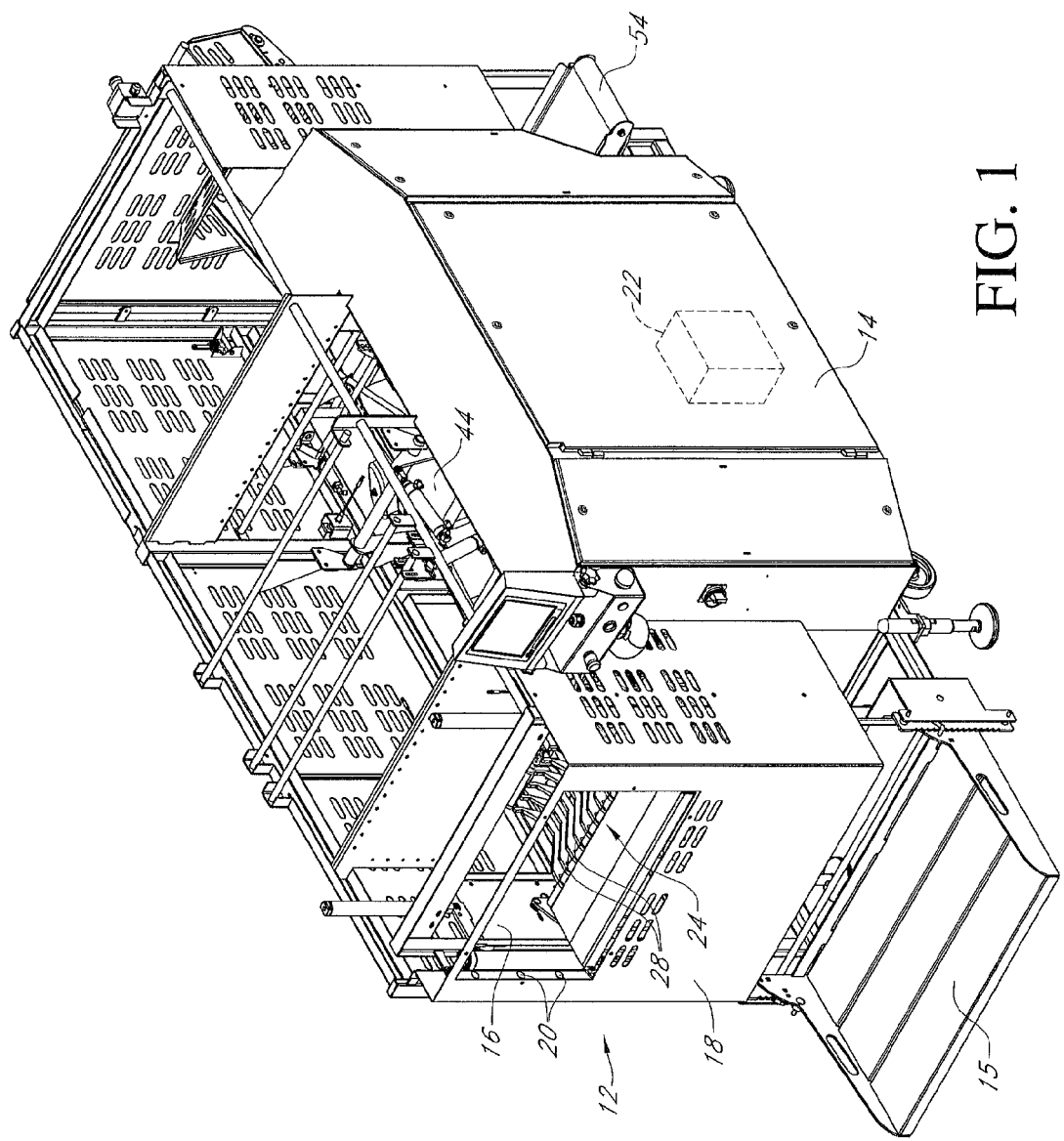
FIG. 1 is a perspective view of an automatic skinning assembly.
Figure 2:
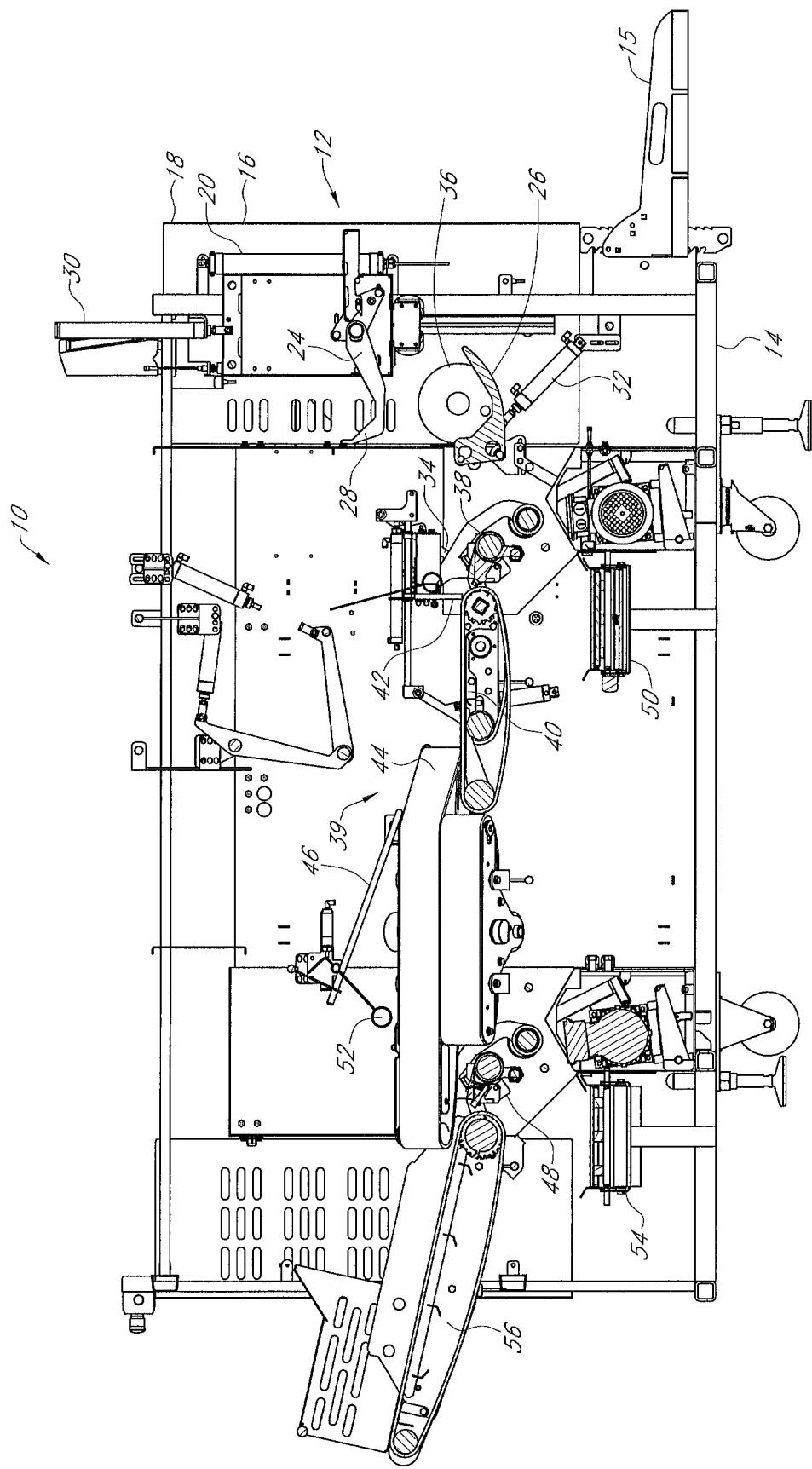
FIG. 2 is a side sectional view of an automatic skinning assembly.
Figure 3:
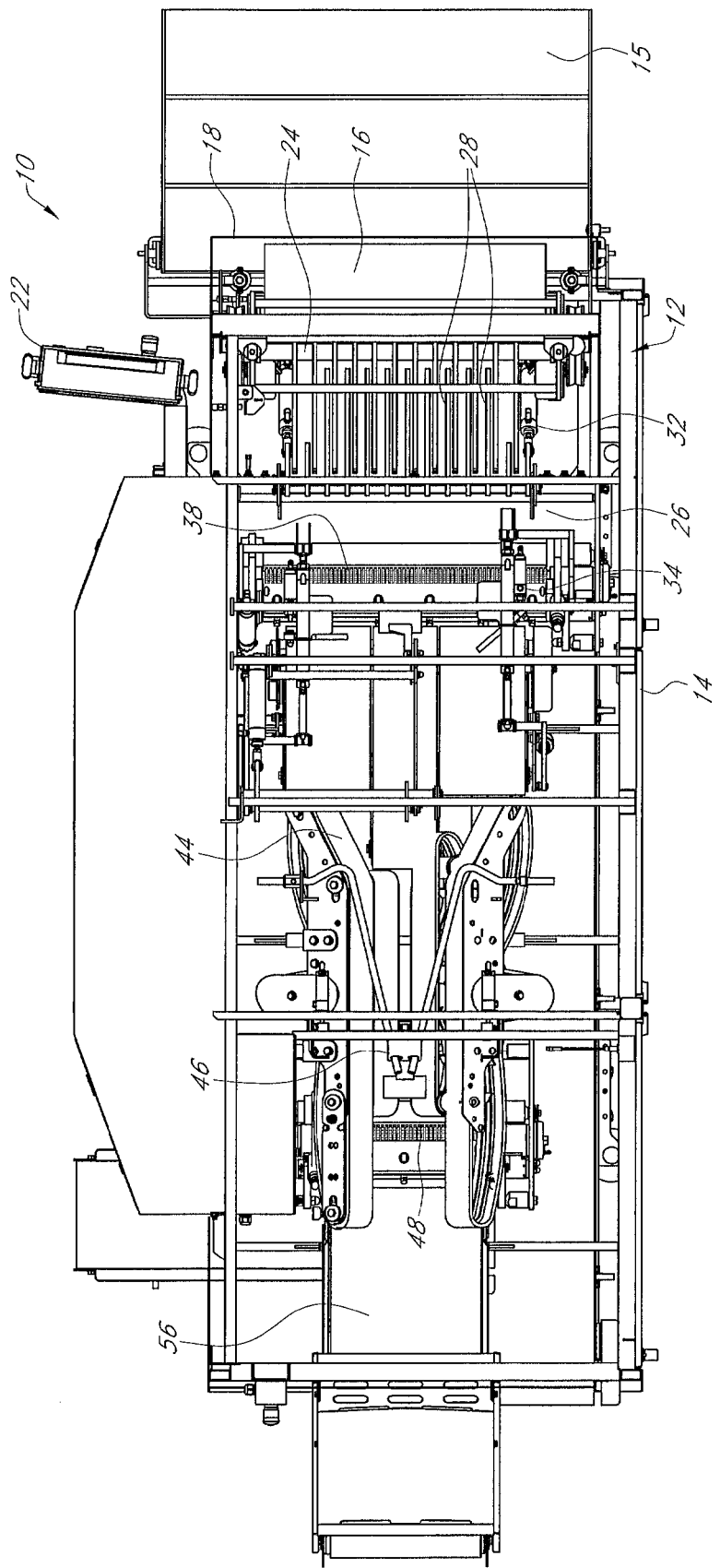
FIG. 3 is a top plan sectional view of an automatic skinning device.

Referring to the Figures automatic skinning assembly 10 has a loading station 12. The loading station 12 has a frame 14 with an attached platform 15 and an opening or window 16 at a first end 18 of the assembly 10. Adjacent the window 16 is one or more sensors 20, such as a light curtain that is/are connected to a micro-computer 22. The sensor 20 detects the presence of an operators hand and/or arm. The loading station 12 also has a first tray 24 and a second tray 26. Each tray 24 and 26 has a plurality of transverse members or fingers 28 that are offset such that the trays 24 and 26 may pass through one another.

The first tray 24 is moveably connected to the frame 14 such that it is moveable in a generally up and down or vertical direction by means of an actuator 30 such as an air cylinder or the like connected to the micro-computer 22. The second tray 26 is moveably connected to the frame 14 such that the second tray 26 moves from a loading position to a skinning position by means of an actuator 32 connected to the micro-computer 22.

Moveably connected to the frame 14, adjacent the second tray 26, is a shank hold down device 34. The shank hold down device 34 is positioned such that it provides a downward force on a shank of a food product 36 to ensure that the food product 36 remains generally parallel as the food product moves into a first skinning device 38. The first skinning device 38 is conventional having a shoe, tooth roll, blade, pressure means and stripper.

A conveyor system 39 downstream of the first skinning device 38 includes a transport conveyor 40 for transporting the skinned food product away from the first skinning device 38 and toward a turning plate or rail 42. The turning plate 42 is positioned such that as the food product 36 is transported downstream by conveyor 40, the turning plate 42 engages the food product 36 approximately 90 degrees. As this occurs the shank hold down device 34 holds the shank of the food product 36. Once rotated, the food product 36 engages one or more positioning conveyors or rails 46. The positioning rails 44 are operatively mounted to the frame 14 above a portion of the transport conveyor 40 and are located in such a manner as to tip the food product 36 to a generally vertical position. Preferably, the position rails 46 are angled upwardly and inwardly in relation to the transport conveyor 40.

Below a portion of the positioning rails 46 is a V-conveyor 44 that positions the food product 36 to be presented to a second skinning device 48. Inside the V-conveyor is a second rotation device that further orients the product for optimal skinning position. The second skinning device 48 is conventional having a tooth roll, show, blade, pressure means, and stripper.

In operation, a food product 36 is supplied to an operator standing on a platform 15. The operator places the food product 36 in the first tray 24. Once the operator clears the light curtain 20, the micro-computer 22 that is connected to all operating parts, activates the assembly. Once activated, the first tray 24 is lowered such that it passes through the second tray 26 transferring the food product 36 to the second tray 26. The position of the first and/or second trays 24 and 26 may be adjusted manually or automatically based upon the diameter of the food product and its weight which can be sensed and determined with the micro-computer 22 or weighed and measured by the operator. Once transferred, the food product 36 is rotated along with the second tray 26 toward the first skinning device 38. The shank hold down device 34 helps to eliminate and/or prevent patching during skinning. As a result a single clean sheet of skin with little lean is removed and deposited below the first skinning device 38 to a first take away conveyor 50.

Once the first pass of skinning is completed the transfer conveyor 40 moves the food product 36 forward while the hold down device 34 maintains downward pressure on the shank which prevents the food product 36 from rotating on the transport conveyor 40 prematurely. Once the food product 36 engages the turning plate 42 the food product is rotated horizontally on the transport conveyor 40. The food product 36 then engages the positioning rails 46 which lift the food product 36 partially off of the transport conveyor 40. The positioning rails 46 are angled to accommodate food products 36 of different sizes.

The food product 36 is then received by the V-conveyor 44 where the food product 36 falls a small distance from the positioning rails 46. As the food product falls, a paddle 52 mounted to the frame 14 above the V-conveyor engages the leg of the food product 36, rotating the leg backward to put the food product 36 in position for the second pass of skinning. The second skinning device 48 removes the remaining skin from a back side of the food product 36. A second clean sheet of skin with little lean is removed and deposited below a second take away conveyor 54. Once the second pass is completed, the skinned food product 36 is transported away from the second skinning device by a third take away conveyor 56. Adjustments and functions of the assembly are controlled by the micro-computer 22 which may be pre-programmed for desired specifications and/or product size ranges.

To accommodate both left and right shanks, dual assemblies that mirror one another are provided. Alternatively, a second hold down device and turning plate are positioned on the opposite side of the transport conveyor 40. Also, both the first and the second skinning devices may be adjusted separately to different skin thickness.

What is claimed is:

1. An automatic skinning assembly for a food product, comprising:
   a loading station;
   a first skinning device adjacent the loading station;
   a second skinning device;
   a conveyor assembly extending between the first skinning device and a second skinning device and having a transport conveyer; and
   a turning device arranged to rotate the food product approximately 90 degrees on the transport conveyor.

2. The assembly of claim 1 wherein the conveyor assembly is capable of rotating and lifting the food product on the transport conveyor.

3. The assembly of claim 1 wherein the loading station includes a first tray and a rotatable second tray.

4. The assembly of claim 1 further comprising a hold down device arranged to provide a downwardly force on the food product as the food product is moved into the first skinning device.

5. The assembly of claim 1 further comprising a rotation device parallel to the first skinning device to assist rotation of the food product during the first skinning step.

6. The assembly of claim 1 wherein the conveyor assembly includes the transport conveyor, positioning rails, and a V-conveyor.

7. The method of claim 6 further comprising the step of lifting the food product partially off the transport conveyor to a generally vertical position.

8. The method of claim 6 further comprising the step of holding down the food product with a hold down device during the first skinning pass.

9. The method of claim 6 further comprising the step of removing at least one clean sheet of skin from the food product with little lean.

10. The assembly of claim 1 further comprising a micro-computer capable of adjusting and controlling the first and second skinning devices and the conveyor assembly.

11. The assembly of claim 10 wherein the micro-computer is pre-programmed for at least one of the desired specifications and product size ranges.

12. The assembly of claim 1 wherein the turning device is a plate or a rail.

13. The assembly of claim 1 further comprising at least one positioning rail located after the turning device and arranged to lift a food product at least partially from the transport conveyor.

14. The assembly of claim 13 further comprising a paddle disposed after the at least one positioning rail and adapted for rotating the food product prior to the second skinning device.

15. A method of automatically skinning a food product, comprising the steps of:
    loading a food product in an automatic skinning assembly;
    automatically presenting the food product to a first skinning device for a first skinning pass;
    transporting the food product to a second skinning device on a conveyor assembly including a transport conveyor;
    presenting the food product to the second skinning device for a second skinning pass; and
    rotating the food product approximately 90 degrees on the transport conveyor with a turning device.

16. An automatic skinning assembly for a food product, comprising:
    a loading station;
    a first skinning device adjacent the loading station, the loading station including at least one tray for transporting the food product to the first skinning device;
    a second skinning device; and
    a conveyor assembly having a transport conveyor extending between and moving in only a forward direction from the first skinning device to the second skinning device.

17. The assembly of claim 16 wherein the loading station includes a frame and the at least one tray includes a first tray moveably connected to the frame in a vertical direction.

18. The assembly of claim 17 wherein the at least one tray further includes a second tray connected to the frame and arranged for rotating from the first tray to the first skinning device.

19. The assembly of claim 16 further comprising at least one positioning rail arranged to lift a food product at least partially from the transport conveyor.

20. The assembly of claim 19 further comprising a paddle disposed after the at least one positioning rail and adapted for rotating the food product prior to the second skinning device.

* * * * *